United States Patent
Koyama et al.

(10) Patent No.: US 9,731,240 B2
(45) Date of Patent: Aug. 15, 2017

(54) METHOD FOR BACKWASHING FILTER

(71) Applicants: Yoshinori Koyama, Nagasaki (JP);
Osamu Shinada, Nagasaki (JP);
Yuichiro Kitagawa, Nagasaki (JP);
Takao Hashimoto, Tokyo (JP)

(72) Inventors: Yoshinori Koyama, Nagasaki (JP);
Osamu Shinada, Nagasaki (JP);
Yuichiro Kitagawa, Nagasaki (JP);
Takao Hashimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 172 days.

(21) Appl. No.: 14/073,529

(22) Filed: Nov. 6, 2013

(65) Prior Publication Data

US 2014/0059982 A1 Mar. 6, 2014

Related U.S. Application Data

(63) Continuation of application No. 13/003,722, filed as application No. PCT/JP2009/065666 on Sep. 8, 2009, now abandoned.

(30) Foreign Application Priority Data

Dec. 22, 2008 (JP) ................. 2008-325234

(51) Int. Cl.
*B01D 46/00* (2006.01)
*C10K 1/02* (2006.01)
*C10J 3/84* (2006.01)

(52) U.S. Cl.
CPC ..... *B01D 46/0069* (2013.01); *B01D 46/0068* (2013.01); *C10J 3/84* (2013.01);
(Continued)

(58) Field of Classification Search
CPC B01D 46/0069; B01D 46/00; B01D 46/0068; C10K 1/024; C10J 2300/1653; C10J 3/84; Y02E 20/16; Y02E 20/18
(Continued)

(56) References Cited

U.S. PATENT DOCUMENTS 4,295,686 A 10/1981 Black
4,295,868 A 10/1981 Hölter et al.
(Continued)

FOREIGN PATENT DOCUMENTS

JP 49-7542 2/1974
JP 1-189318 A 7/1989
(Continued)

OTHER PUBLICATIONS

Australian Patent Examination Report No. 1, dated May 21, 2014, for Australian Application No. 2009332116.
(Continued)

*Primary Examiner* — T. Bennett McKenzie
(74) *Attorney, Agent, or Firm* — Birch, Stewart, Kolasch & Birch, LLP

(57) ABSTRACT

The reliability of backwashing valves constituted of first backwashing valves and second backwashing valves is ensured. A first backwashing valve (backwashing-gas rear valve) (7) that controls gas for backwashing and a second backwashing valve (backwashing-gas front valve) (6) that operates at slower speed than the first backwashing valve (7) are disposed, in a series including two or more thereof, at backwashing-gas introducing pipes individually provided for each of the filter blocks.

2 Claims, 3 Drawing Sheets

(52) U.S. Cl.
CPC ....... *C10K 1/024* (2013.01); *C10J 2300/1653* (2013.01); *Y02E 20/16* (2013.01); *Y02E 20/18* (2013.01)

(58) Field of Classification Search
USPC .............................. 55/282–305; 95/273–287
See application file for complete search history.

(56) References Cited

U.S. PATENT DOCUMENTS

| | | | |
|---|---|---|---|
| 4,299,597 | A | 11/1981 | Oetiker et al. |
| 4,343,631 | A | 8/1982 | Ciliberti |
| 4,539,025 | A | 9/1985 | Ciliberti et al. |
| 4,690,700 | A | 9/1987 | Howeth |
| 4,734,110 | A | 3/1988 | Premel et al. |
| 5,116,395 | A | 5/1992 | Williams |
| 5,167,676 | A | 12/1992 | Nakaishi et al. |
| 5,254,144 | A | 10/1993 | Provol |
| 6,056,796 | A | 5/2000 | Chiang et al. |
| 6,273,925 | B1* | 8/2001 | Alvin ................ B01D 39/2027 55/282.2 |
| 6,302,931 | B1* | 10/2001 | Min ................ B01D 46/0068 55/283 |
| 6,658,988 | B1 | 12/2003 | Dries |
| 2002/0014156 | A1* | 2/2002 | Leibold ............ B01D 46/0024 95/280 |
| 2005/0034690 | A1* | 2/2005 | Sedda ...................... F01L 9/04 123/90.11 |
| 2008/0271607 | A1* | 11/2008 | Mahon ............... B01D 46/0068 96/421 |

FOREIGN PATENT DOCUMENTS

| | | |
|---|---|---|
| JP | 8-192019 A | 7/1989 |
| JP | 4-118016 A | 4/1992 |
| JP | 4-326916 A | 11/1992 |
| JP | 7-256036 A | 10/1995 |
| JP | 9-234324 A | 9/1997 |
| JP | 10-28827 A | 2/1998 |
| JP | 10-33827 A | 2/1998 |
| JP | 10-197022 A | 7/1998 |
| JP | 11-253727 A | 9/1999 |
| JP | 2001-813 A | 1/2001 |
| JP | 2001-17813 A | 1/2001 |
| JP | 3197144 B2 | 8/2001 |
| JP | 2003-136919 A | 5/2003 |
| JP | 2004-66187 A | 3/2004 |
| JP | 2004-196894 A | 7/2004 |
| JP | 2010-142774 A | 7/2010 |

OTHER PUBLICATIONS

Japanese Office Action and English translation thereof, dated Apr. 15, 2014, for Japanese Application No. 2013-151524.

Notice of Patent Grant, dated Jun. 22, 2016, for Indonesian Application No. WO0201100336, together with an English translation thereof.

Canadian Notice of Allowance dated Oct. 18, 2012 for corresponding Canadian Patent Application No. 2,729,941.

Japanese Notice of Allowance dated in Japanese Patent Application No. 10-2011-7001415 on Dec. 20, 2013.

Japanese Office Action issued in Japanese Patent Application No. 2008-325234 dated May 21, 2013 is attached hereto.

Korean Notice of Allowance issued in Korean Patent Application No. 10-2011-7001415 dated Dec. 20, 2013.

* cited by examiner

METHOD FOR BACKWASHING FILTER

CROSS-REFERENCE TO RELATED APPLICATIONS

This application is a Continuation of U.S. application Ser. No. 13/003,722, filed on Feb. 3, 2011, which is a National Stage of Application No. PCT/JP2009/065666, filed on Sep. 8, 2009, which claims priority on Patent Application No. 2008-325234, filed in Japan on Dec. 22, 2008, the contents of each are hereby expressly incorporated by reference into the present application.

FIELD OF THE INVENTION

The present invention relates to an apparatus for backwashing filter (dust removal device) that mainly uses a filter element formed of a porous material to remove dust from gases containing dust.

DESCRIPTION OF THE RELATED ART

A known apparatus for backwashing filter is, for example, disclosed in Patent Literature 1.

CITATION LIST

Patent Literature

PTL 1 The Publication of Japanese Patent No. 3197144.

SUMMARY OF INVENTION

However, with the apparatus for backwashing filter disclosed in the above-described Patent Literature 1, a first backwashing valve (backwashing-gas front valve) and a second backwashing valve (backwashing-gas rear valve) are both configured so as to move quickly in an extremely short period of time (about 0.1 second) from a fully-closed position to a fully-open position, or from the fully-open position to the fully-closed position. Consequently, as the number of opening/closing operations increases, rotation shafts, bearings, valve bodies, etc., of the first backwashing valve and second backwashing valve become deteriorated, making it impossible to completely block channels connected to the first backwashing valve and second backwashing valve, resulting in the problem of difficulties in ensuring reliability of backwashing valves constituted of the first backwashing valve and the second backwashing valve.

The present invention has been made in view of the above-described circumstances, and an object thereof is to provide an apparatus for backwashing filter that is capable of ensuring the reliability of backwashing valves constituted of a first backwashing valves and a second backwashing valves.

In order to solve the above-described problems, the present invention employs the following solutions.

An apparatus for backwashing filter according to a first aspect of the present invention is an apparatus for backwashing filter in a dust removal device using porous material, having a plurality of filter blocks which are constituted of a plurality of filter elements accommodated in a pressure vessel and partitioning plates that partition or support these filter blocks, the pressure vessel being internally divided into a space for dust-containing gas, which includes a dust hopper, and a plurality of spaces for purified gas; in an apparatus for backwashing filter that periodically performs backwashing of the filter elements for each of the filter blocks, wherein a backwashing nozzle directed toward the filter elements is provided inside purified-gas lead-out pipes or inside spaces upstream thereof, each of which is connected to the plurality of spaces for the purified gas or a filter-element outlet, a first backwashing valve that controls gas for backwashing and a second backwashing valve that operates at slower speed than the first backwashing valve are disposed, in two series, at backwashing-gas introducing pipes individually provided for each of the filter blocks.

With the apparatus for backwashing filter according to the above-described first aspect, upon starting a backwashing cycle, first, the second backwashing valve slowly moves from a fully-closed position to a fully-open position over a predetermined period of time. At this time, the first backwashing valve does not move, remaining in the fully-closed position (maintains the fully-closed position). When the second backwashing valve reaches the fully-open position and a predetermined period of time has passed, the first backwashing valve quickly moves from the fully-closed position to the fully-open position over an extremely short period of time, and thus, the second backwashing valve and the first backwashing valve are in the fully-open positions and the backwashing is performed for an extremely short period of time. When the backwashing is completed, the first backwashing valve quickly moves from the fully-open position to the fully-closed position over an extremely short period of time. At this time, the second backwashing valve does not move, remaining in the fully-open position (maintains the fully-open position). When the first backwashing valve reaches the fully-closed position and a predetermined period of time has passed, the second backwashing valve slowly moves from the fully-open position to the fully-closed position over a predetermined period of time, and the second backwashing valve reaches the fully-closed position, thus ending the backwashing cycle. Then, when a predetermined period of time has passed, the second backwashing valve begins to move again from the fully-closed position to the fully-opened position, thus starting the next backwashing cycle.

Accordingly, it is possible to reduce deterioration of a rotation shaft, a bearing, a valve body, etc., of the second backwashing valve; even when there is considerable deterioration in a rotation shaft, a bearing, a valve body, etc., of the first backwashing valve, it is possible to completely block a channel to which the first backwashing valve and the second backwashing valve are connected by having the second backwashing valve in the fully-closed position; and thus, it is possible to ensure the reliability of a backwashing valve constituted of the first backwashing valve and the second backwashing valve.

An apparatus for backwashing filter according to a second aspect of the present invention is an apparatus for backwashing filter in a dust removal device using porous material, having a plurality of filter blocks which are constituted of a plurality of filter elements accommodated in a pressure vessel and partitioning plates that partition or support these filter blocks, the pressure vessel being internally divided into a space for dust-containing gas, which includes a dust hopper, and a plurality of spaces for purified gas; in an apparatus for backwashing filter that periodically performs backwashing of the filter elements for each of the filter blocks, wherein a backwashing nozzle directed toward the filter elements is provided inside purified-gas lead-out pipes or inside spaces upstream thereof, each of which is connected to the plurality of spaces for the purified gas or a filter-element outlet, a first backwashing valve and a second backwashing valve are disposed, in two series, at backwashing-gas introducing pipes individually provided for each of the filter blocks, and gas for backwashing is controlled by the first backwashing valve alone.

With the apparatus for backwashing filter according to the above-described second aspect, upon starting a backwashing cycle, the first backwashing valve quickly moves from the fully-closed position to the fully-open position over an extremely short period of time, and the first backwashing valve reaches the fully-open position, thus performing the backwashing for an extremely short period of time. When the backwashing is completed, the first backwashing valve quickly moves from the fully-open position to the fully-closed position over the extremely short period of time, thus ending the backwashing cycle. Then, when a predetermined period of time has passed, the first backwashing valve begins to move again from the fully-closed position to the fully-open position, thus starting the next backwashing cycle.

Note that, during a backwashing cycle and between one backwashing cycle and another backwashing cycle, the second backwashing valve does not move, remaining in the fully-open position (maintains the fully-open position).

Accordingly, it is possible to reduce deterioration of the rotation shaft, the bearing, the valve piece, etc., of the second backwashing valve; even when there is considerable deterioration in the rotation shaft, the bearing, the valve piece, etc., of the first backwashing valve, it is possible to completely block the channel to which the first backwashing valve and the second backwashing valve are connected, by having the second backwashing valve in the fully-closed position; and thus it is possible to ensure the reliability of a backwashing valves constituted of the first backwashing valve and the second backwashing valve.

An integrated coal gasification combined cycle (IGCC) system according to a third aspect of the present invention is equipped with an apparatus for backwashing filter that is capable of reducing the deterioration of the rotation shaft, the bearing, the valve piece, etc., of the second backwashing valve; that is capable of, even when there is considerable deterioration in the rotation shaft, the bearing, the valve piece, etc., of the first backwashing valve, completely blocking the channel to which the first backwashing valve and the second backwashing valve are connected by having the second backwashing valve in the fully-closed position; and that is capable of ensuring the reliability of a backwashing valve constituted of the first backwashing valve and the second backwashing valve.

With the integrated coal gasification combined cycle system according to the above-described third aspect, it is possible to ensure the reliability of a backwashing valve constituted of the first backwashing valve and the second backwashing valve, and thus, it is possible to improve the reliability of the system as a whole.

The present invention affords an advantage in that it is possible to ensure the reliability of a backwashing valve constituted of a first backwashing valve and a second backwashing valve.

DETAILED DESCRIPTION OF THE INVENTION

Figure 1:
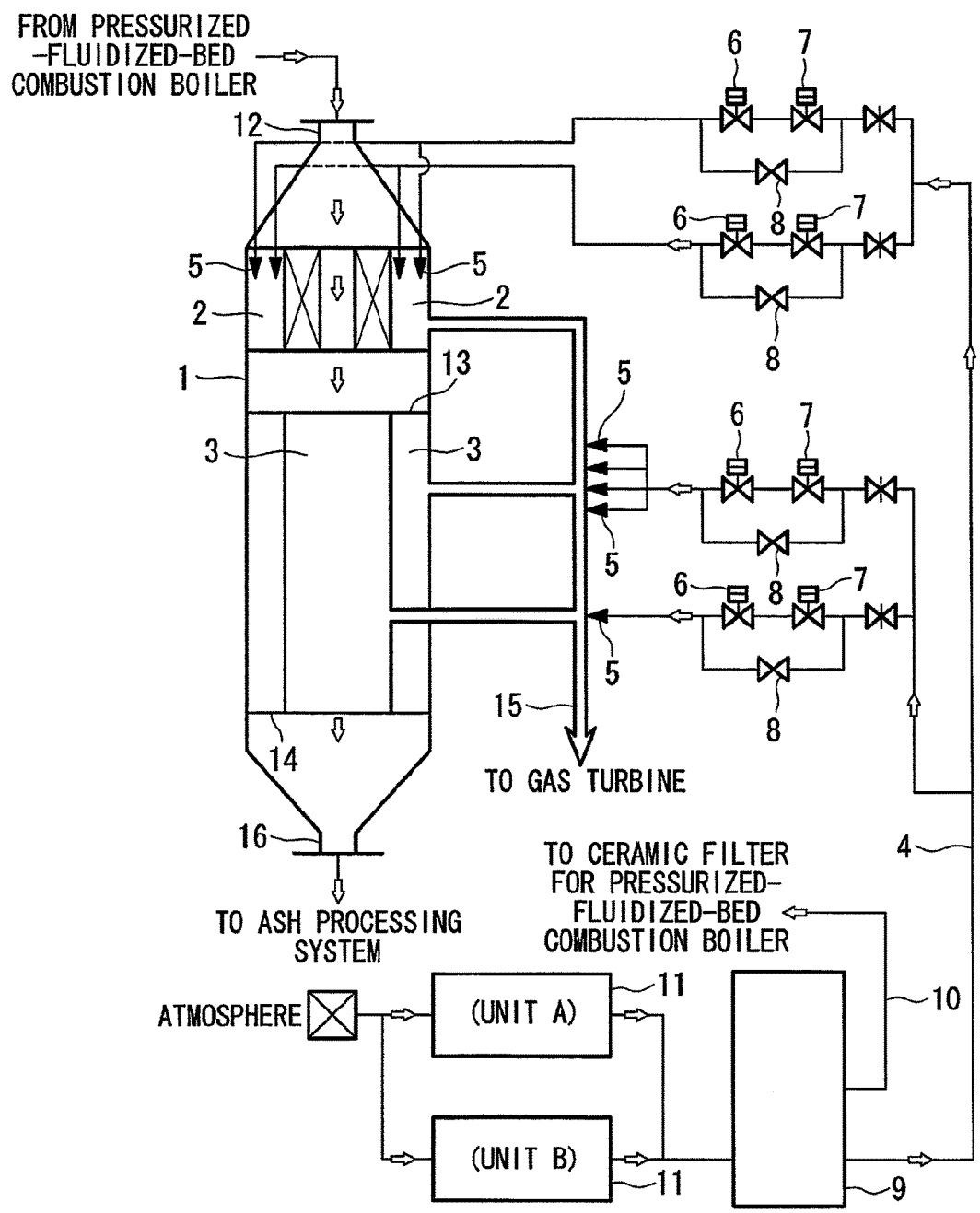
FIG. 1 is a diagram of a gas system in an apparatus for backwashing filter for pressurized-fluidized-bed combustion boilers according to the present invention.

An embodiment of the present invention will be described below using the diagram of a backwashing-gas system in an apparatus for backwashing filter for a pressurized-fluidized-bed combustion boiler shown in FIG. 1 and the explanatory diagram for the sequence of associated operations between backwashing-gas front and rear valves shown in FIG. 2.

In this embodiment, a total of four blocks are provided as filter blocks, two of which are in a honeycomb-type element (filter element) 2 at a top portion of a pressure vessel 1 and two of which are in a cylinder-type element (filter element) 3 at a bottom portion. Consequently, a backwashing-gas system 4 is divided into four subsystems and, in each system, a number of backwashing nozzles 5 required for the corresponding block is provided, and a set of backwashing valves constituted of a backwashing-gas front valve (second backwashing valve) 6, a backwashing-gas rear valve (first backwashing valve) 7, and a manual bypass valve 8 is provided on the upstream side of the backwashing nozzle 5.

A backwashing-gas buffer tank 9 is provided upstream of the backwashing-gas system 4, and, in addition, each pressurized-fluidized-bed-combustion boiler filter is connected to the backwashing-gas buffer tank 9 via a pipe 10.

Two high-pressure gas compressors 11 are provided upstream of the backwashing-gas buffer tank 9 and, of these two compressors, one compressor is used as an auxiliary unit.

The thus-configured backwashing-gas system 4 is operated as follows. That is, regarding high-temperature dust-containing gas that has entered from a dust-containing gas inlet 12 disposed at the top portion of the pressure vessel 1 of the pressurized-fluidized-bed-combustion boiler filter, one part thereof is subjected to dust removal in the two filter blocks at the top portion, which are configured of the porous-material honeycomb-type elements 2, and the remaining high-temperature dust-containing gas is subjected to dust removal in the two filter blocks formed of the cylinder-type elements 3 divided by a top-portion partitioning pipe plate (partitioning plate) 13, bottom-portion partitioning pipe plate (partitioning plate) 14, and inner-cylinder/outer-cylinder partitioning plate that are disposed at the bottom portion.

Purified gas that has passed through individual elements is removed to the outside via corresponding purified-gas lead-out pipes 15 and, after being combined, moves toward a gas turbine disposed downstream thereof. Dust that has been removed by each filter block drops to a dust hopper disposed at the bottom portion on the high-temperature dust-containing gas side and is discharged from a dust hopper outlet 16.

However, dust adhered to the high-temperature dust-containing gas side of each element does not necessarily drop off naturally, and it is necessary to cause a gas flow in a direction opposite to a normal flow, that is, to increase a gas pressure by applying a pressure wave of high-pressure gas in the opposite direction for an extremely short period of time (for example, 0.5 second) to shake off the dust adhered on the high-temperature dust-containing gas side, i.e., to perform backwashing. This backwashing is usually performed cyclically block by block in turn, and backwashing intervals are designed to be about several minutes.

Figure 2:
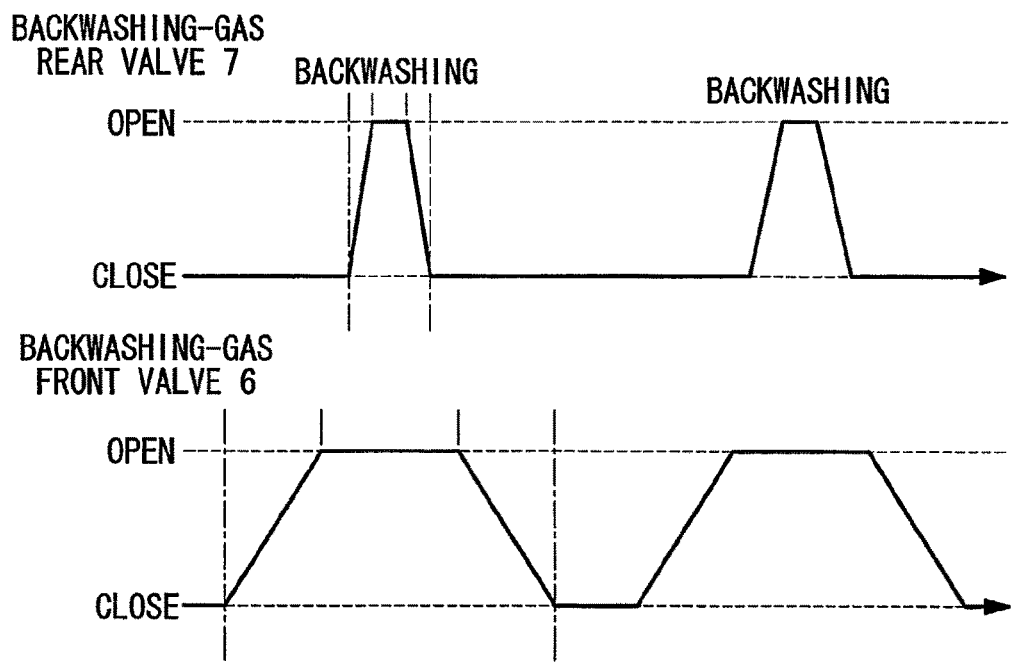
FIG. 2 is an explanatory diagram for a sequence of associated operations between backwashing-gas front and rear valves according to an embodiment of the present invention.

As shown in FIG. 2, upon starting a backwashing cycle, first, the backwashing-gas front valve 6 slowly moves from a fully-closed position to a fully-open position over a predetermined period of time (for example, 2 to 10 seconds). At this time, the backwashing-gas rear valve 7 does not move, remaining in the fully-closed position (maintains the fully-closed position). When the backwashing-gas front valve 6 reaches the fully-open position and a predetermined period of time (for example, 1 to 2 seconds) has passed, the backwashing-gas rear valve 7 quickly moves from the fully-closed position to the fully-open position over an extremely short period of time (for example, 0.1 to 1 second), and thus, the backwashing-gas front valve 6 and the backwashing-gas rear valve 7 are in the fully-open positions, and the backwashing is performed for an extremely short period of time (for example, 0.1 to 1 second). When the backwashing is completed, the backwashing-gas rear valve 7 quickly moves from the fully-open position to the fully-closed position over an extremely short period of time (for example, 0.1 to 1 second). At this time, the backwashing-gas front valve 6 does not move, remaining in the fully-open position (maintains the fully-open position). When the backwashing-gas rear valve 7 reaches the fully-closed position and a predetermined period of time (for example, 1 to 2 seconds) has passed, the backwashing-gas front valve 6 slowly moves from the fully-open position to the fully-closed position over a predetermined period of time (for example, 2 to 10 seconds), and the backwashing-gas front valve 6 reaches the fully-closed position, thus ending the backwashing cycle. Then, when a predetermined period of time (for example, 4 to 10 minutes) has passed, the backwashing-gas front valve 6 begins to move again from the fully-closed position to the fully-open position, thus starting the next backwashing cycle.

With the apparatus for backwashing filter according to this embodiment, it is possible to reduce deterioration of a rotation shaft, a bearing, a valve piece, etc., of the backwashing-gas front valve 6 as compared with a conventional apparatus; even when there is considerable deterioration in a rotation shaft, a bearing, a valve piece, etc., of the backwashing-gas rear valve 7, it is possible to completely block a channel to which the backwashing-gas front valve 6 and the backwashing-gas rear valve 7 are connected by having the backwashing-gas front valve 6 in the fully-closed position; and thus, it is possible to ensure the reliability of the backwashing valves constituted of the backwashing-gas front valves 6 and the backwashing-gas rear valves 7.

Another embodiment of the present invention will be described using the explanatory diagram for the sequence of associated operations between backwashing-gas front and rear valves shown in FIG. 3.

Figure 3:
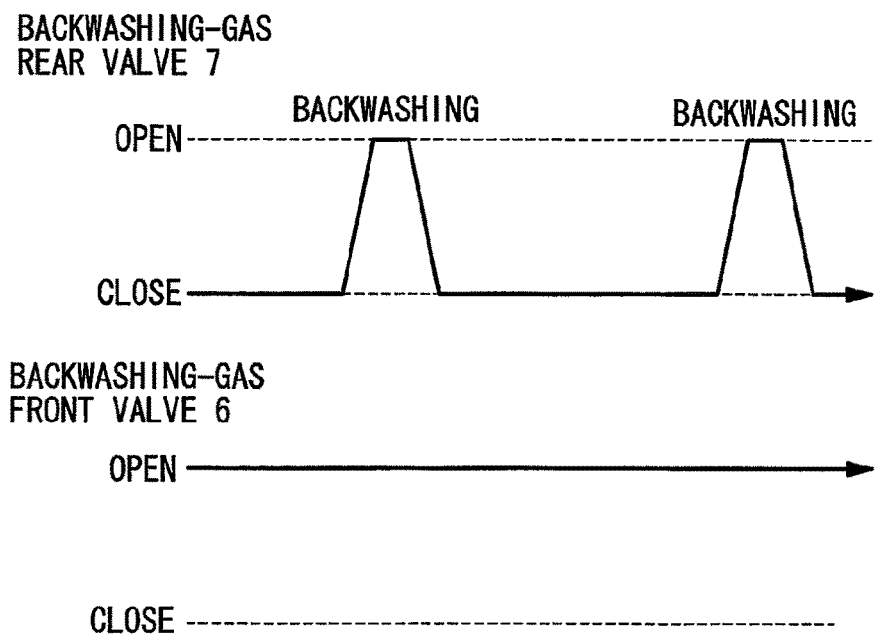
FIG. 3 is an explanatory diagram for a sequence of associated operations between backwashing-gas front and rear valves according to another embodiment of the present invention.

As shown in FIG. 3, this embodiment differs from the above-described first embodiment in that the backwashing-gas front valve 6 is constantly maintained in the fully-open position (except for when it needs to be moved to the fully-closed position).

That is, upon starting a backwashing cycle, the backwashing-gas rear valve 7 quickly moves from the fully-closed position to the fully-open position over an extremely short period of time (for example, 0.1 to 1 second), and the backwashing-gas rear valve 7 reaches the fully-closed position, thus performing backwashing for an extremely short period of time (for example, 0.1 to 1 second). When the backwashing is completed, the backwashing-gas rear valve 7 quickly moves from the fully-open position to the fully-closed position over an extremely short period of time (for example, 0.1 to 1 second), thus ending the backwashing cycle. Then, when a predetermined period of time (for example, 4 to 10 minutes) has passed, the backwashing-gas rear valve 7 begins to move again from the fully-closed position to the fully-open position, thus starting the next backwashing cycle.

With the apparatus for backwashing filter according to this embodiment, it is possible to reduce deterioration of the rotation shaft, the bearing, the valve piece, etc., of the backwashing-gas front valve 6 as compared with the first embodiment; even when there is considerable deterioration in the rotation shaft, the bearing, the valve piece, etc., of the backwashing-gas rear valve 7, it is possible to completely block the channel to which the backwashing-gas front valve 6 and the backwashing-gas rear valve 7 are connected, by having the backwashing-gas front valve 6 in the fully-closed position; and thus it is possible to ensure the reliability of the backwashing valves constituted of the backwashing-gas front valves 6 and the backwashing-gas rear valves 7.

Note that the present invention is not limited to the above-described embodiments, and various alterations and modifications are possible, for example, to the number and operation sequence of the backwashing valves, within a range that does not depart from the gist of the present invention.

Figure 4:
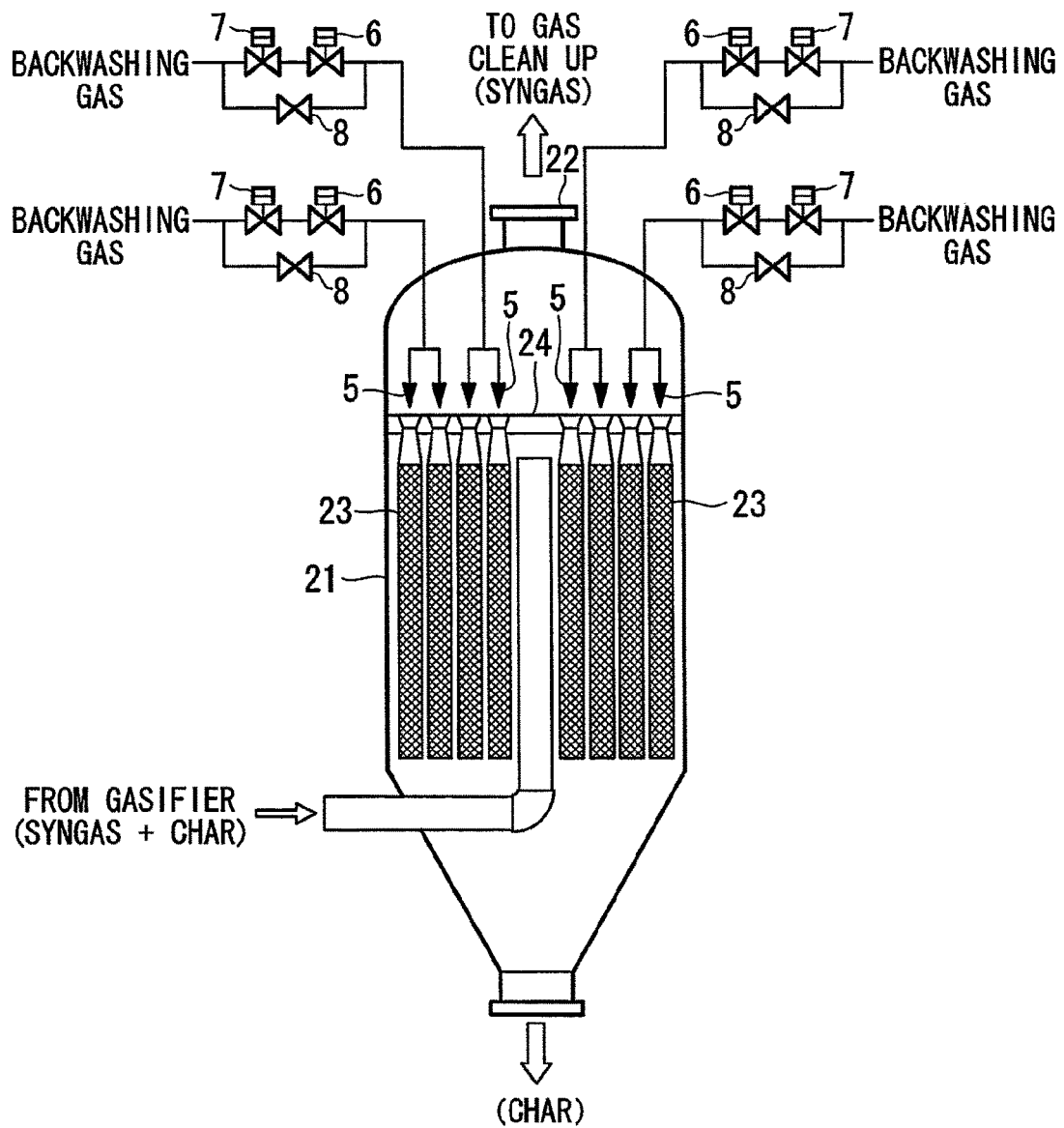
FIG. 4 is a diagram showing another embodiment of the present invention and is a diagram showing a gas system around a pressure vessel.

The application of the apparatus for backwashing filter according to the present invention is not limited to integrated coal gasification combined cycle systems equipped with the pressure vessel 1 shown in FIG. 1; it is also applicable to integrated coal gasification combined cycle systems equipped with a pressure vessel 21 shown in FIG. 4.

Note that, reference signs 22, 23, and 24 in FIG. 4 denote a gas lead-out pipe, a cylinder-type element (candle-type filter element), and a top-portion partitioning plate (tube sheet), respectively.

REFERENCE SIGNS LIST

1: pressure vessel
2: honeycomb-type element (filter element)
3: cylinder-type element (filter element)
4: backwashing-gas system
5: backwashing nozzle
6: backwashing-gas front valve (second backwashing valve)
7: backwashing-gas rear valve (first backwashing valve)
8: manual bypass valve
9: backwashing-gas buffer tank
10: pipe
11: high-pressure gas compressor
12: dust-containing gas inlet
13: top-portion partitioning pipe plate (partitioning plate)
14: bottom-portion partitioning pipe plate (partitioning plate)
15: purified-gas lead-out pipe
16: dust hopper outlet
21: pressure vessel
22: gas lead-out pipe
23: cylinder-type element (candle-type filter element)
24: top-portion partitioning plate (tube sheet)

The invention claimed is:

1. A method for operating a dust removal device, the dust removal device comprising:
a pressure vessel comprising a partitioning plate contained within the vessel, a plurality of filter blocks supported by the partitioning plate and a dust hopper provided at a lower part of the pressure vessel, wherein each filter block comprises a plurality of filter elements and wherein partitioning plate partitions the pressure vessel into a space for dust-containing gas which includes the dust hopper and a space for purified gas, the dust removal device further comprising a back washing system provided to clean the plurality of filter elements, wherein the back washing system comprises:

at least one purified-gas lead-out pipe, the at least one purified-gas lead-out pipe comprising at least one backwashing nozzle, wherein each nozzle is provided in the space for purified gas and wherein each nozzle is directed toward the filter elements, the at least one purified-gas lead-out pipe further comprising a first valve and a second valve, wherein the first and second valves are provided in the at least one purified-gas lead-out pipe, wherein the first and second valves are disposed in series and wherein the second valve operates at a slower speed than the first valve, the backwashing system is operated in a plurality of backwashing cycles, wherein each backwashing cycle provided backwashing gas to the nozzles so as to clean the filter elements and wherein each backwashing cycle comprises:

a first step wherein the second valve is moved from a fully-closed position to a fully-open position in 2 to 10 seconds, with the first backwashing valve in a fully closed position;

a second step wherein after the first step has completed, the first valve is maintained in the fully-closed position and the second valve is in the fully-opened position for 1 to 2 seconds;

a third step wherein after the second step has completed, the first valve is moved from the fully-closed position to a fully-open position in 0.1 to 1 second with the second valve being maintained in the fully-open position;

a fourth step wherein after the third step has completed, both the first and second valves are maintained in the fully-opened positions for 0.1 to 1 second such that backwashing gas flows through the first and second valves into the at least one purified gas lead-out pipe and through the at least one nozzle so as to clean the filter elements;

a fifth step wherein after the fourth step has completed, the first valve is moved from the fully-open position to the frilly-closed position in 0.1 to 1 second with the second valve being maintained in the fully-open position;

a sixth step wherein for 1 to 2 seconds after the fifth step has completed, the first valve is maintained in the fully-closed position and the second valve is maintained in the fully-opened position; and a seventh step wherein after the sixth step has completed, the second valve is moved from the fully-opened position to the fully-closed position in 2 to 10 seconds; wherein the next backwashing cycle is started after 4 to 10 minutes have passed after the seventh step is completed.

2. A method for operating a dust removal device, the dust removal device comprising:

a pressure vessel comprising a partitioning plate contained within the vessel, a plurality of filter blocks supported by the partitioning plate and a dust hopper provided at a lower part of the pressure vessel, wherein each filter block comprises a plurality of filter elements and wherein partitioning plate partitions the pressure vessel into a space for dust-containing gas which includes the dust hopper and a space for purified gas, the dust removal device further comprising a back washing system provided to clean the plurality of filter elements, wherein the back washing system comprises:

at least one purified-gas lead-out pipe, the at least one purified-gas lead-out pipe comprising at least one backwashing nozzle, wherein each nozzle is provided in the space for purified gas and wherein each nozzle is directed toward the filter elements, the at least one purified-gas lead-out pipe further comprising a first valve and a second valve, wherein the first and second valves are provided in the at least one purified-gas lead-out pipe, wherein the first and second valves are disposed in series, the backwashing system is operated in a plurality of backwashing cycles, wherein each backwashing cycle provided backwashing gas to the nozzles so as to clean the filter elements, the second valve is disposed in a downstream side of the first valve in a flowing direction of the backwashing gas, and wherein each backwashing cycle includes,
  a first step in which the first valve is moved rapidly from a fully-closed position to a fully-open position in 0.1 to 1 second;
  a second step in which backwashing is performed for 0.1 to 1 second with the first valve in the fully-opened position; and
  a third step in which the first valve is rapidly moved from the fully-open position to the fully-closed position in 0.1 to 1 second, and wherein a next backwashing cycle is started when 4 to 10 minutes have passed after the third step is finished, and wherein the second valve is maintained in a fully-open position during the backwashing cycle and throughout an entire period from an end of the backwashing cycle to a start of the next backwashing cycle.

* * * * *